United States Patent
Day-Cain

Patent Number: 5,232,371
Date of Patent: Aug. 3, 1993

[54] FOLDED-SPIRAL BOOK

[76] Inventor: Kathleen M. Day-Cain, Star Route Box 343C, Pearce, Ariz. 85625

[21] Appl. No.: 872,990

[22] Filed: Apr. 24, 1992

[51] Int. Cl.$^5$ .......................... G09B 17/00; B42D 1/00
[52] U.S. Cl. ...................... 434/428; 40/359; 281/2; 281/5; 281/15.1; 283/62
[58] Field of Search ............... 281/2, 5, 15.1; 283/62, 283/61; 40/359; 273/285, 287; 434/426, 428

[56] References Cited

U.S. PATENT DOCUMENTS

| | | | |
|---|---|---|---|
| 483,715 | 10/1892 | Fisher | 281/15.1 |
| 1,638,277 | 8/1927 | Smith | 281/15.1 |
| 2,531,510 | 11/1950 | Heacock | 273/285 |
| 2,883,195 | 4/1959 | Rogers et al. | 273/155 |
| 3,191,328 | 6/1965 | Lohnes | 40/124.1 |
| 3,206,887 | 9/1965 | Eyler et al. | 46/17 |
| 4,120,100 | 10/1978 | Dugan | 35/73 |
| 4,371,169 | 2/1983 | Compton | 273/285 X |
| 4,527,800 | 7/1985 | Samansky | 273/287 X |
| 4,627,640 | 12/1986 | Markovics | 281/5 |
| 5,018,764 | 5/1991 | Beardell | 281/2 |

FOREIGN PATENT DOCUMENTS

| | | | |
|---|---|---|---|
| 3011065 | 10/1981 | Fed. Rep. of Germany | 281/15.1 |
| 2214693 | 9/1989 | United Kingdom | 281/15.1 |

*Primary Examiner*—Gene Mancene
*Assistant Examiner*—L. Thomas
*Attorney, Agent, or Firm*—Antonio R. Durando; Harry M. Weiss

[57] ABSTRACT

A circular book configuration wherein each page consists of a fixed section of a circle folded over the next adjacent page. Multiple circular book leaves are stacked on top of each other with a common center and each leaf is connected to its two adjacent leaves along the radius of the circle to form a continuous spiral or helicoidal structure, so that each page can be folded over the next page in a continuous spiraling manner from one end of the book to the other. The book is assembled in reverse order of display by starting from the top leaf, which contains the last page of the book, folding it over the next to the last page, and so on down the spiral of stacked circular leaves. When all pages are thus folded, the result is a book shaped like a pie wedge, wherein the last folded page corresponds to the first page to be viewed. The book is viewed by continuously unfolding successive pages, which results in a continuing full circular view being seen at all times.

6 Claims, 1 Drawing Sheet

FOLDED-SPIRAL BOOK

RELATED DOCUMENTS

This application is related to Disclosure Document No. 287,736 filed on Jul. 29, 1991.

BACKGROUND OF THE INVENTION

1. Field of the Invention

This invention is related to the general field of books and written publications. In particular, the invention provides a novel helicoidal structure for assembling and viewing printed material, which is especially suitable for children's educational books.

2. Description of the Prior Art

Everyone is familiar with the normal format and structure of books, magazines and other printed material available to convey information to the public. For centuries, books have generally consisted of a stack of leaves combined at a common edge to form a spine and bound by a protective cover. The material is viewed by sequentially turning leaves to expose pages from one end of the stack to the other. Within this general framework, many variations have been developed for specific purposes, but the basic feature of multiple pages attached to a common spine has remained intact.

One of the characteristics of the conventional book format is the limited space available for displaying large amounts of pictorial information, which at times may be problem for a clear presentation of the material. Since it can only be shown either within the limits of the same book spread or sequentially on different pages, the obvious result is that only a small portion of the material can be viewed at the same time. Thus, for example, it is difficult to properly present a dioramic scene within the constraints of a standard book or magazine. For that reason, publishers often resort to centerfolds to increase the space available in a single display.

This invention deals with a new concept in book format and structure that is particularly suitable for large displays and visual continuity in story telling and that, therefore, is very useful for educational children's books. The idea involves a helicoidal book structure wherein each page unfolds next to the preceding page in a continuous open spiral. A search of the prior art has revealed some related patents, specifically U.S. Pat. No. 2,883,195 to Rogers et al. (1959), U.S. Pat. No. 3,191,328 to Lohnes (1956), U.S. Pat. No. 3,206,887 to Eyler et al. (1965) and U.S. Pat. No. 4,120,100 to Dugan (1978). None of these patents describes a spiral structure similar to the book format disclosed herein.

BRIEF SUMMARY OF THE INVENTION

The main objective of this invention is the development of a novel book format that permits the contemporaneous viewing of material presented in multiple sequential pages, thus expanding the scope of the material viewed at any given time.

Another objective is a book format that is particularly suitable for visual displays associated with instructional story telling for children's educational material.

Still another goal is a book that provides an unusual reading format that children are likely to find interesting and attractive, thus providing amusement together with instructional information.

A further goal of the invention is a book that can be manufactured economically by using commercially available materials, components and techniques.

According to these and other objectives, the simplest embodiment of this invention features a circular book configuration wherein each page consists of a fixed section of a circle folded over the next adjacent page. Multiple circular book leaves are stacked on top of each other with a common center and each leaf is connected to its two adjacent leaves along the radius of the circle to form a continuous spiral or helicoidal structure, so that each page can be folded over the next page in a continuous spiraling manner from one end of the book to the other. The book is assembled in reverse order of display by starting from the top leaf, which contains the last page of the book, folding it over the next to the last page, and so on down the spiral of stacked circular leaves. When all pages are thus folded, the result is a book shaped like a pie wedge, wherein the last folded page corresponds to the first page to be viewed. The book is viewed by continuously unfolding successive pages, which results in a continuing full circular view being seen at all times.

Various other purposes and advantages of the invention will become clear from its description in the specifications that follow and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DETAILED DESCRIPTION OF THE INVENTION

This invention is based on the idea that a spiral book format provides a convenient and attractive way to present a story line, especially when dealing with children's educational books. In its simplest form, the invention consists of consecutive pages shaped like a circular section which are sequentially folded together to form a book in the shape of a pie's wedge. For the purposes of the invention, though, the outer edge of each page does not have to correspond to an arc of a circle, but can instead assume any shape consistent with the spiral format of the book's configuration.

Figure 1:
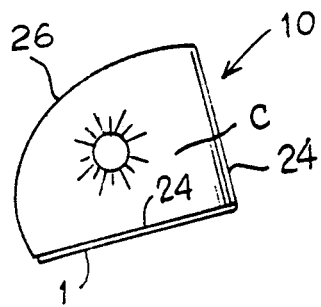
FIG. 1 is a perspective view of a helicoidal book according to this invention having quarter-circular pages.

Referring to the drawings, wherein like parts are referenced throughout with like numerals and symbols, FIG. 1 shows a perspective view of a wedge-shaped helicoidal book 10 according to the invention. For simplicity of illustration, the book 10 is shown in the shape of a quarter-circular wedge, but this shape is not critical to the spiral configuration of the invention, as will be detailed below. The book 10 is seen in its folded or unopened condition, with the first page 1 placed at the bottom of the wedge and the rest of the book folded on top of it. Because of its quarter-circular shape, each page comprises two straight radial edges 24 that come together at the center of the circular structure to form a 90 degree angle and an outside arc edge 26 equal to the arc of a quarter circle.

Figure 2:
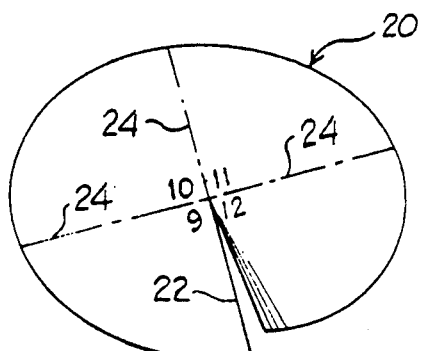
FIG. 2 is an exploded view of the same book to illustrate its circular multileaf structure.
Figure 2:
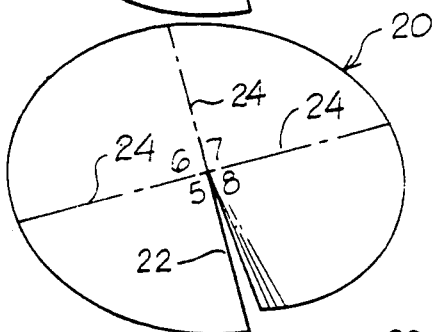
Figure 2:
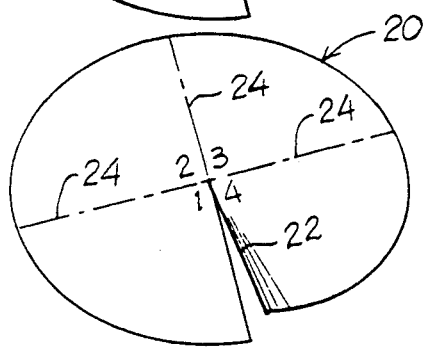
Figure 3:
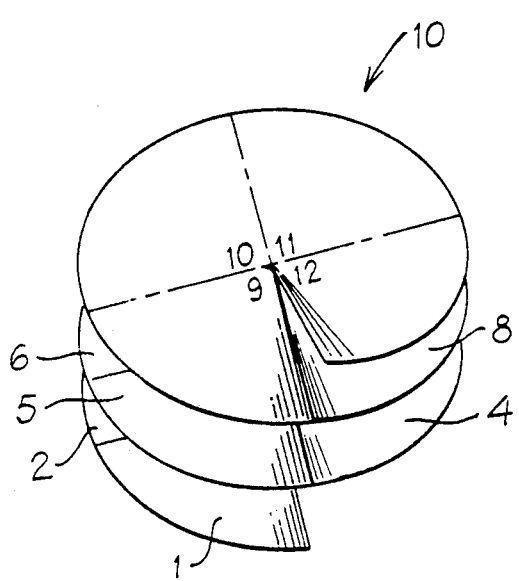
FIG. 3 is a view of the leaves of FIG. 2 after connection to form a helicoidal assembly.
Figure 4:
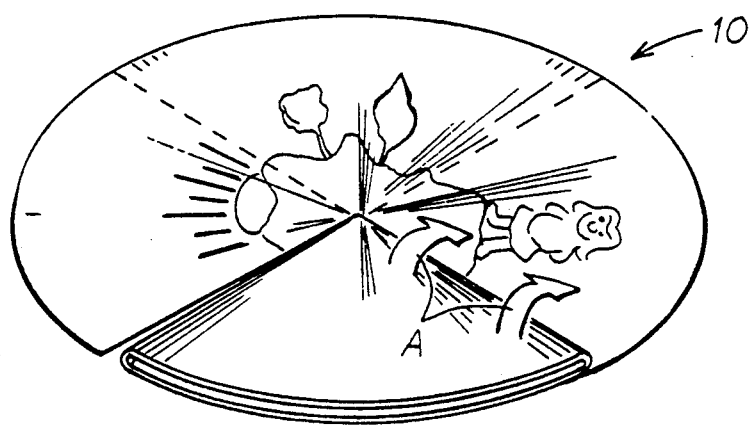
FIG. 4 is a perspective view of the book of FIG. 1 illustrating the way its pages are folded together.

As illustrated in the exploded view of FIG. 2, which shows a 12-page structure for example, the book comprises multiple circular leaves 20 stacked on top of each other; each leaf is subdivided into pages, numbered 1 through 12 in the drawing, corresponding to a fixed quarter-circle page. Each page shares a common straight radial edge 24 with an adjacent page and each leaf is connected to the adjacent leaves by a common radial edge 22 formed by cutting each leaf between two pages along the radius of the circular leaf. Thus, the radial edges 22 of page 4 in the bottom leaf and page 5 in the leaf above it are attached to each other, by tape or equivalent means, to form a common edge 24; in turn, the edges of pages 8 and 9 are also attached, yielding a single unit of continuous spiralling pages from top to bottom, as illustrated in FIG. 3. The assembly of the book 10 is completed by folding the last page (page 12 in the example illustrated) counterclockwise over page 11, and then folding the two over page 10, and so on, as illustrated in FIG. 4, until all pages are successively folded to produce the book of FIG. 1. Thus, the pages are folded starting from the last page in the top leaf and continuing downward to the first page in the bottom leaf, as illustrated by the arrows A in FIG. 4. Note that, as a result of the described folding procedure, the back side of pages 1 and 2 necessarily constitute the cover C of the book 10 seen in FIG. 1. Book 10 is shown as being folded counterclockwise for illustration, but, of course, it could be constructed in equivalent fashion to fold clockwise simply by shifting the connections between the edges 22 of the various leaves.

The opposite procedure is followed to view the contents of the book. That is, page 1 at the bottom is first seen by unfolding the rest of the book while keeping page 1 at rest, and then page 2 is similarly uncovered, and so on until the last page 12 is opened. Therefore, page 1 remains in view when page 2 is unfolded, and each page in the first leaf continues to remain visible until page 5 is opened to cover page 1. At any given time after that point, four pages are always simultaneously visible to a reader. This characteristic is particularly useful for children books with dioramas and similar linear illustrations.

As mentioned above, the important feature of this book format is the sequence of foldable pages shaped like a section of a circle and connected by their radial edge to form a spiral. In fact, the book can be constructed by so connecting individual pages, rather than whole leaves, as shown above. So long as each page is smaller than a semicircle, individual equal pages can be connected by their radial edges and can be folded over adjacent pages in spiral form to produce the book format of the invention. At the limit, semicircular pages would yield a semicircular book with a common spine wherein consecutive pages would alternate from one side to the other of the spine progressively toward the center of the book. Of course, a book with greater than semicircular leaves could not be built according to this helicoidal format because such pages could not be folded continuously over one another. It is also important to note that, although approximately equal in size, each progressively inner page of the book is necessarily slightly smaller that the preceding pages in order to account for the thickness of the material constituting the pages and allow for its continuous folding along the radial edge of each page.

Although the preferred embodiment is described in terms of exact quarter-circle pages, it could be manufactured in equivalent fashion by using one-sixth, one-seventh, one-eighth or any other fractional section of a circle that might be desired for a particular display. Similarly, the outside edge of each page (which is shown as the arc of a circle 26 in the embodiment illustrated in the drawings) can assume any shape desired because it is not functionally important that it be a true circular arc for the book format described herein. In fact, that edge can be used to add specific shapes to the book that might enhance its character and attractiveness. For example, in a basic geometry book the outside edge of each page could take the form of a different geometric figure; or, in a zoo book, each edge could contour the head of a different animal.

Moreover, the pages do not have to be equal in order to practice the invention. The only critical feature is the ability to fold each page over the others. Therefore, so long as the angle between the straight radial edges of each page is the same, this requirement is met. Otherwise, the height and arc edge of each page can vary freely without affecting the functionality of the book. In fact, I found that this variable page format adds considerable flexibility to the use this book, which can be employed in many creative ways to capture the attention and interest of children. For example, progressively shorter color pages could be used to illustrate the geometry of a spiral, or to create a continuous path leading to a surprise at the end of the book (which would also correspond to its innermost pages).

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein, but is to be accorded the full scope of the claims so as to embrace any and all equivalent apparatus and methods.

I claim:

1. A foldable spiral book comprising:
    a plurality of pages wherein each of said pages comprises two connecting edges, an outside edge and an angle between said connecting edges, each of said pages having a foldable connection along at least one of its connection edges with another of said pages, wherein the total of the angles of the plurality of pages is greater than 360 degrees.

2. The book described in claim 1, wherein said outside edge of each page corresponds to the arc of a circle.

3. The book described in claim 1, wherein said angle between said connecting edges is 90 degrees.

4. A method of making a book, comprising the following steps:
    providing a plurality of pages wherein each of said pages comprises two connecting edges, an outside edge and an angle between said connecting edges; and
    producing a foldable connection between each page and at least one other page wherein said connection is made by attaching one of the connection edges of one page with one of the connection edges of another of said pages, and wherein the total of the angles of the plurality of pages is greater than 360 degrees.

5. The book described in claim 4, wherein said angle between said connecting edges is 90 degrees.

6. The method described in claim 4, wherein said angle between said two straight radial edges is 90 degrees.

* * * * *